US008860634B2

(12) United States Patent
Benson et al.

(10) Patent No.: US 8,860,634 B2
(45) Date of Patent: Oct. 14, 2014

(54) HEAD MOUNTABLE DISPLAY

(71) Applicant: Sony Computer Entertainment Europe Limited, London (GB)

(72) Inventors: Simon Mark Benson, London (GB); Ian Henry Bickerstaff, London (GB)

(73) Assignee: Sony Computer Entertainment Europe Limited (GB)

( * ) Notice: Subject to any disclaimer, the term of this patent is extended or adjusted under 35 U.S.C. 154(b) by 183 days.

(21) Appl. No.: 13/649,765

(22) Filed: Oct. 11, 2012

(65) Prior Publication Data

US 2014/0104143 A1 Apr. 17, 2014

(51) Int. Cl.
*G09G 5/00* (2006.01)
*G02B 27/01* (2006.01)

(52) U.S. Cl.
CPC .......... *G09G 5/00* (2013.01); *G02B 2027/0187* (2013.01); *G02B 2027/0138* (2013.01); *G02B 27/017* (2013.01); *G02B 2027/014* (2013.01)
USPC ............................................................. 345/8

(58) Field of Classification Search
CPC ........................... G02B 27/017; G09G 5/00
See application file for complete search history.

(56) References Cited

U.S. PATENT DOCUMENTS

| | | | | |
|---|---|---|---|---|
| 6,937,400 | B2 * | 8/2005 | Olsson | 359/630 |
| 7,193,584 | B2 * | 3/2007 | Lee | 345/7 |
| 8,643,951 | B1 * | 2/2014 | Wheeler et al. | 359/630 |
| 8,665,177 | B2 * | 3/2014 | Herrmann et al. | 345/8 |
| 2002/0113755 | A1 | 8/2002 | Lee | |
| 2006/0077558 | A1 * | 4/2006 | Urakawa et al. | 359/630 |
| 2008/0088529 | A1 * | 4/2008 | Tang | 345/8 |
| 2010/0149073 | A1 * | 6/2010 | Chaum et al. | 345/8 |
| 2010/0157433 | A1 | 6/2010 | Mukawa et al. | |
| 2011/0222745 | A1 * | 9/2011 | Osterhout et al. | 382/118 |
| 2011/0234584 | A1 * | 9/2011 | Endo | 345/419 |
| 2011/0248904 | A1 * | 10/2011 | Miyawaki et al. | 345/7 |
| 2012/0212508 | A1 * | 8/2012 | Kimball | 345/633 |
| 2013/0128364 | A1 * | 5/2013 | Wheeler et al. | 359/630 |
| 2013/0222271 | A1 * | 8/2013 | Alberth et al. | 345/173 |

FOREIGN PATENT DOCUMENTS

| | | |
|---|---|---|
| CA | 2750287 A1 | 11/2011 |
| EP | 1731943 A4 | 9/2010 |

OTHER PUBLICATIONS

Inernational Search Report and Written Opinion for Application No. PCT/GB2013/052646 dated Dec. 20, 2013.

* cited by examiner

*Primary Examiner* — Dwayne Bost
*Assistant Examiner* — Ivelisse Martinez Quiles
(74) *Attorney, Agent, or Firm* — Lerner, David, Littenberg, Krumholz & Mentlik, LLP

(57) ABSTRACT

A head-mountable display (HMD) comprises a frame for mounting on a user's head, a camera mounted on the frame for capturing a view of the user's eyes, a motion detector for detecting motion of the HMD and for generating a motion signal representing a movement of the HMD with respect to time, and a controller. The controller estimates a distance between the user's eyes by capturing a relative separation of the user's eyes from an image of the user's eyes captured by the camera at a start position. The controller processes a motion period of the motion signal, and estimates a displacement of the user's eyes with respect to the frame. The HMD can adjust a relative position at which a first image is displayed to one eye and position at which a second image is displayed to the other eye for an improved viewing experience.

16 Claims, 9 Drawing Sheets

HEAD MOUNTABLE DISPLAY

BACKGROUND

1. Field of the Invention

This invention relates to head-mountable displays.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A head-mountable display (HMD) is an image or video display device which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the users eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

It is to be understood that both the foregoing general description of the invention and the following detailed description are exemplary, but are not restrictive, of the invention.

SUMMARY

This invention provides a head-mountable display system comprising:

a frame which is configured to be mounted on a user's head, a camera mounted on the frame for capturing a view of the user's eyes, a motion detector for detecting motion of the head mountable display device and for generating a motion signal representing a movement of the head mountable display with respect to time, and a controller configured to estimate a relative distance between the user's eyes with respect to the frame by capturing a relative separation of the user's eyes from an image of the user's eyes captured by the camera at a start position, to process a motion period of the motion signal corresponding to a process in which the user moves the head mountable display from the start position to dispose the head mountable display on the user's head at an end position, and to estimate the relative distance between the user's eyes with respect to the frame by determining a distance from the start position of the head mountable display at which the image of the user's eyes was captured to the end position in which the head mountable display is disposed on the user's head in combination with the relative separation of the user's eyes in the image of the user's eyes captured by the camera at the start position.

Embodiments of the present invention can provide an efficient arrangement for automatically determining an interoccular distance of a user of a HMD. The interoccular distance is a distance between a user's eyes which is different for each person. By measuring the interoccular distance a relative separation of a video image displayed for the left eye and a video image displayed for the right eye of the HMD and or optical elements of the HMD can be adjusted to improve a viewing experience for the user. The improved viewing experience can provide a more realistic and comfortable for the user.

Various further aspects and features of the present invention are defined in the appended claims and include a method of operating an HMD as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6b is an elevation view of the HMD shown in FIG. 6a;

DESCRIPTION OF THE EMBODIMENTS

Figure 1:
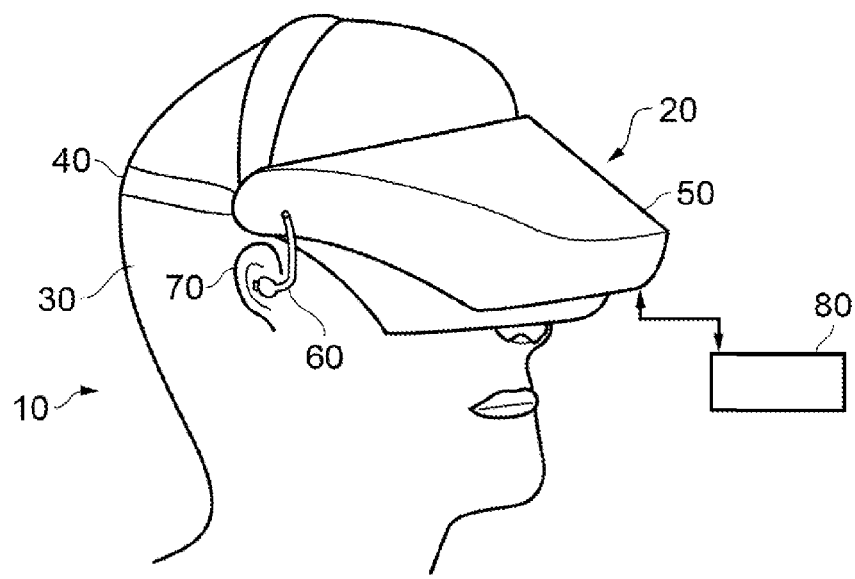
FIG. 1 schematically illustrates an HMD worn by a user.

Referring now to FIG. 1, a user 10 is wearing an HMD 20 on the users head 30. The HMD comprises a frame 40, in this example formed of a rear strap and a top strap, and a display portion 50.

The HMD of FIG. 1 completely obscures the users view of the surrounding environment. All that the user can see is the pair of images displayed within the HMD.

The HMD has associated headphone earpieces 60 which fit into the users left and right ears 70. The earpieces 60 replay an audio signal provided from an external source, which may be the same as the video signal source which provides the video signal for display to the users eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth (R) connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the users view of the external environment may not in fact be entirely obscured; the displayed images could be arranged so as to be superposed (from the users point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the users eyes and the relative position 110 of the users nose. The display portion 50, in schematic form, comprises an exterior shield 120 to mask ambient light from the users eyes and an internal shield 130 which prevents one eye from seeing the display intended for the other eye. The combination of the users face, the exterior shield 120 and the interior shield 130 form two compartments 140, one for each eye. In each of the compartments there is provided a display element 150 and one or more optical elements 160. The way in which the display element and the optical element (s) cooperate to provide a display to the user will be described with reference to FIG. 3.

Figure 3:
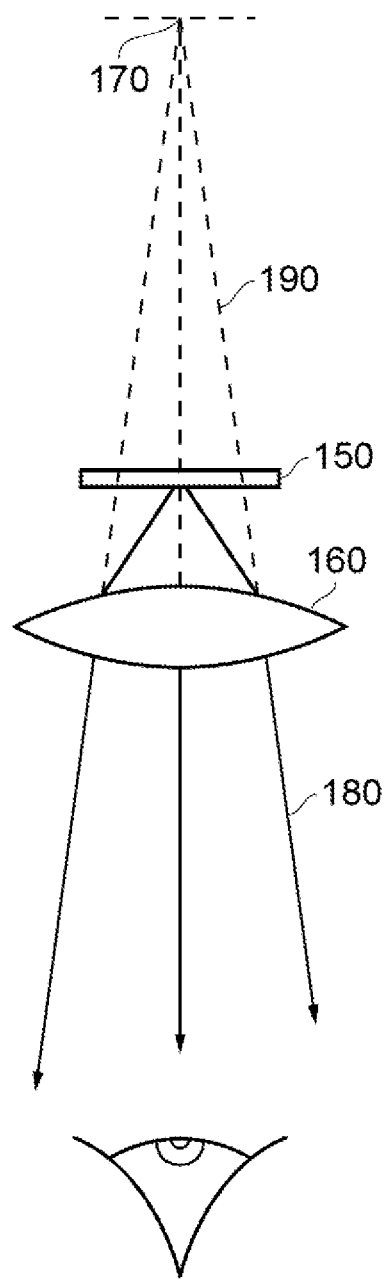
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

Figure 4:
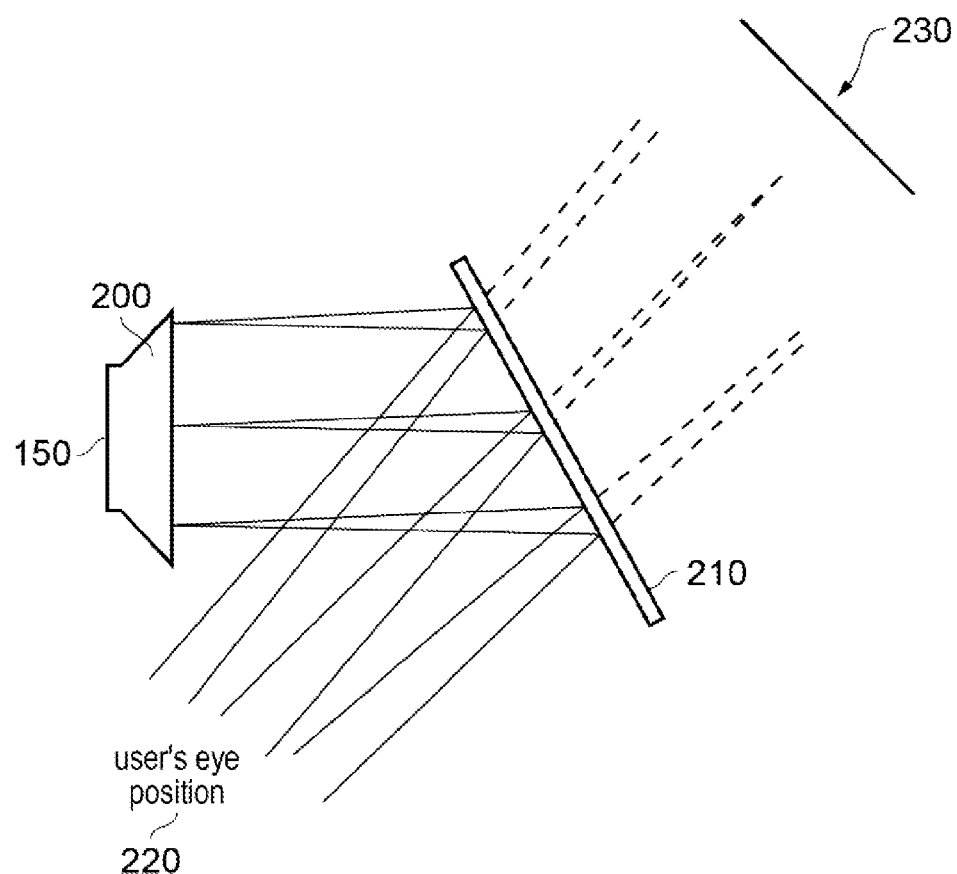
FIG. 4 schematically illustrates another type of display for use in an HMD.

An alternative arrangement is shown in FIG. 4. This arrangement may be used where it is desired that the users view of the external environment is not entirely obscured. However, it is also applicable to HMDs in which the users external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the users view of the external surroundings is entirely obscured, the mirror 210 can be a substantially 100% reflective mirror. The arrangement of FIG. 4 then has the advantage that the display element and optical elements can be located closer to the centre of gravity of the users head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

Figure 2:
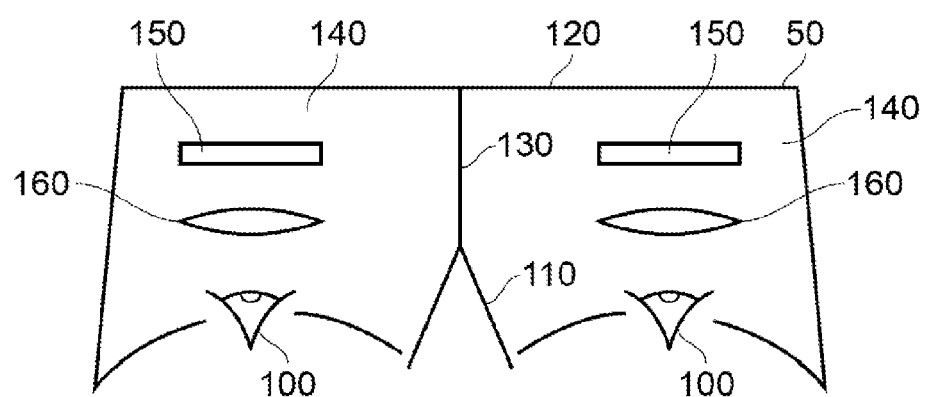
FIG. 2 is a schematic plan view of an HMD.
Figure 6A:
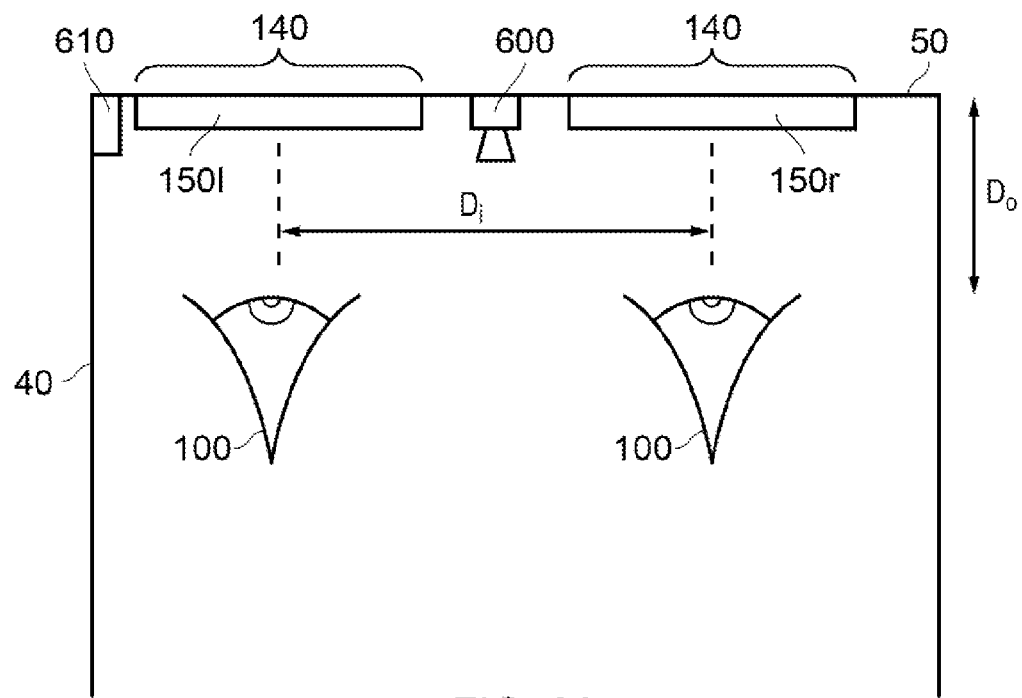
FIG. 6a provides a schematic representation of an HMD illustrating an interoccular distance between a user's eyes and a relative distance of the user's eyes from first and second display positions of an HMD frame.

Embodiments of the present technique can provide an arrangement for automatically detecting a distance between a user's eyes (interoccular distance) efficiently and in a convenient way which reduces a requirement for user interaction. As illustrated in FIG. 6a the HMD shown in FIG. 2 is presented in a slightly simplified form in order to illustrate components which are arranged in one example to estimate the interoccular distance of a user.

As shown in FIG. 6a the HMD is schematically illustrated when disposed upon a user's head. The interoccular distance Di is shown in FIG. 6a for the user. As will be appreciated the first and second display elements 150 are disposed on or with respect to the frame 40 in order to provide respective images for the user's eyes. Thus, a left image is displayed on a left display element 150l and a right image is displayed on the right display element 150r. The HMD is shown to include a camera 600 mounted on or with respect to the HMD frame 40 and a motion detector 610 which detects motion of the HMD and which generates a motion signal representing movement of the HMD with respect to time.

Figure 6B:
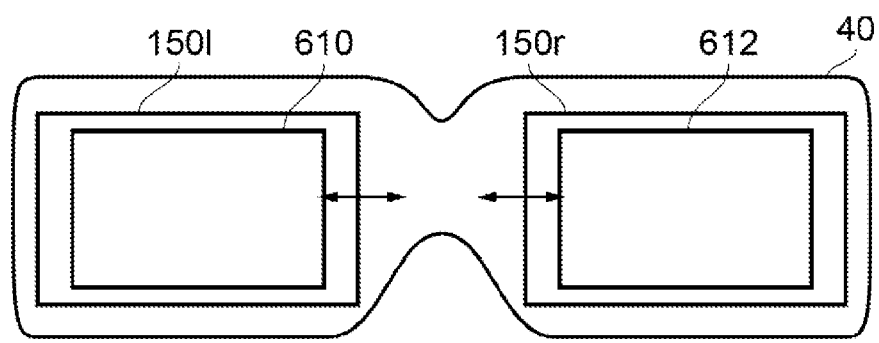

Also shown in FIG. 6a is a relative distance known as an offset distance from the front of the frame to the users eyes Do. As will be appreciated the offset distance from the user's eyes to the position at which the images for the right and left eye are displayed may be used to estimate an adjustment for the user's relative interoccular distance Di which is applied by the HMD when displaying the left and right video images 610, 612 on the respective left and right video display elements 150l, 150r as shown in FIG. 6b. The adjustment of the video images display 610, 612 by the video display elements 150l, 150r is explained in more detail with reference to FIGS. 7a and 7b.

Figure 7A:
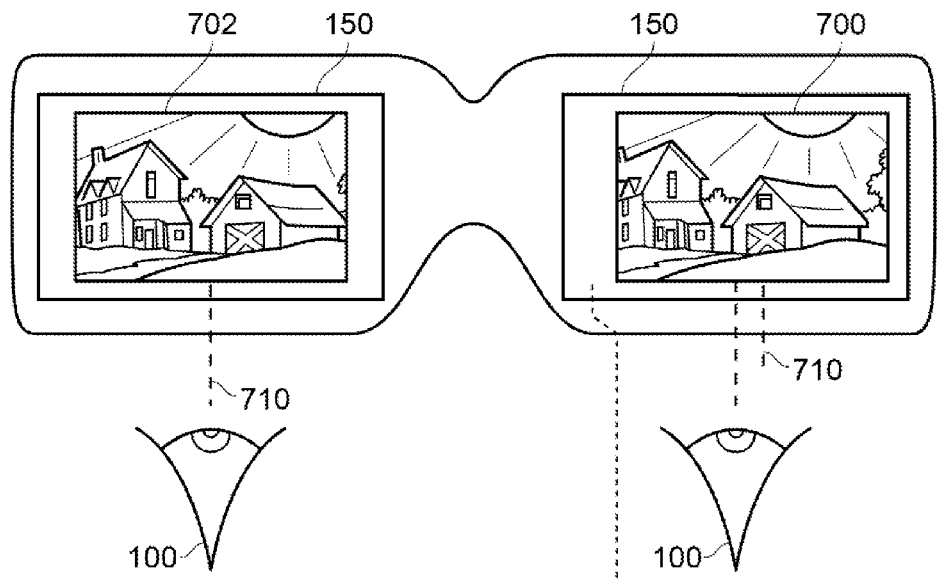
FIG. 7a is a schematic illustration of the HMD shown in FIG. 6a with an elevation view showing video images displayed on left and right display elements in a first position.
Figure 7B:
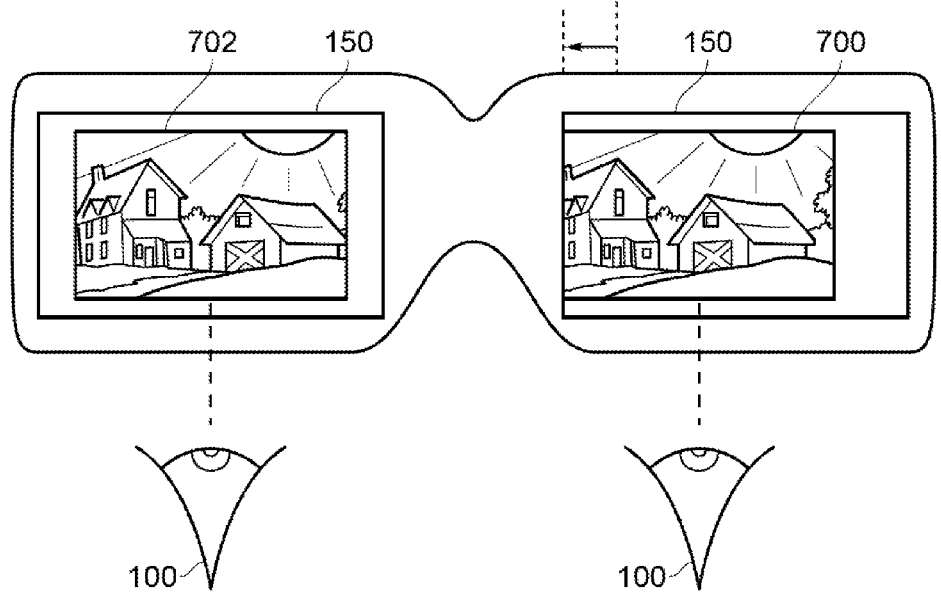
FIG. 7b is the HMD shown in FIG. 7a with the video images displayed in a second position in which the right video display element has been adjusted to move the right displayed video image in accordance with the interoccular distance estimated for the user.

FIGS. 7a and 7b illustrate a process in which a relative position of the first and second video images 700, 702 are adjusted to account for (and in consequence to a detection or estimation of) the interoccular distance Di of the user. As shown in FIG. 7a the interoccular distance Di for the user shown in FIG. 6a is such that a right hand video image when displayed on the right hand video display element 150r will not be centred to a relative position of the user's eye. In contrast, in FIG. 7b, the right hand video image 700 has been repositioned when displayed on the right hand video display element 150r such that it is moved towards the left hand video image 702. The adjustment process has an effect of adjusting relative positions of the right and left video images 700, 702 with the effect that these are more centred to each of a user's eyes thereby improving a viewing experience and comfort to a user. In cooperation with or separately to adjusting the video images, a position of the optical elements of the HMD relative to the user's eyes may also be adjusted to account for the interoccular distance Di of the user. Adjustment of the optical elements enables them to be better aligned with the eyes of the user, thus improving a viewing experience and comfort to a user.

As will be appreciated the example shown in FIGS. 7a and 7b in which the right video image 700 as it is displayed on the right hand video display element 150r is moved towards the left video image 702 as it is displayed on the left video display element 150l is an example only and other ways of moving the video images is possible. It will be appreciated that the left video image 702 could also be moved either toward or away from the right video image 700 and likewise the right video image 700 could be moved toward or away from the left video image 702. It will be appreciated that in other examples the user's eyes may have a greater separation than a default position 710 for the display of the video images 700, 702. Furthermore, it will be appreciated that the video images and the optical elements of the HMD may also be adjusted to account for a vertical misalignment of the user's eyes either relative to each other or relative to the user's head. For example, a vertical misalignment may occur when a user's eyes relative to their ears are in a different position to a presumed default position, or when a user's eyes are at different heights relative to one another. To account for vertical misalignments a vertical position of the left hand and right hand video images and or the optical elements can be adjusted in a manner similar to adjustments which take account of interoccular distance.

In FIGS. 7a and 7b the relative position of display of the video images 700, 702 on the video display elements 150l, 150r is changed in order to adjust the display of the video images 700, 702 to the user in accordance with the interoccular distance Di. In other examples the video display elements 150l, 150r themselves may be moved using for example an electro-mechanical arrangement or servo mechanism or other arrangement to physically adjust the position of the video display elements 150l, 150r, in accordance with the interoccular distance Di.

As will be appreciated from the above explanation, in order to adjust the position of the left and right video images 700, 702 for the user, an estimate is required of the interoccular distance Di as shown in FIG. 6a. One example of the present technique for estimating the interoccular distance will now be explained.

Figure 8:
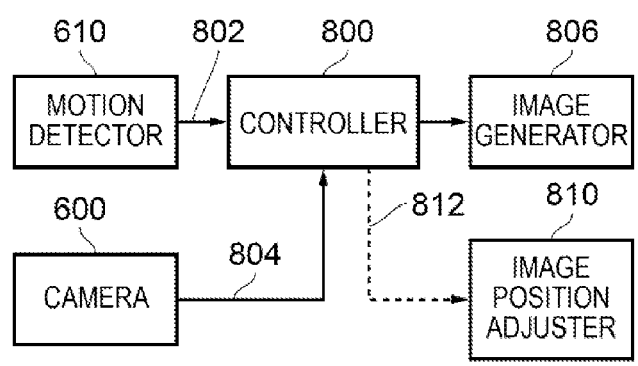
FIG. 8 is a schematic block diagram illustrating an arrangement of components of an HMD which estimate a distance between the user's eyes and adjust the display of the left and/or right video images to compensate for the estimated separation in the user's eyes.

As mentioned above and shown in the example of FIG. 6a, the camera 600 mounted on the frame 40 and the motion detector 610 form part of the HMD according to the present technique. The motion detector 610 could optionally also use a further camera mounted externally in order to detect motion of the HMD. FIG. 8 provides a schematic block diagram of elements which in one example are used to estimate the interoccular distance Di. As shown in FIG. 8 the motion detector 610 generates a motion signal which is fed via a connecting channel 804 to a controller 800. Similarly the camera 600 shown in FIG. 6a feeds a signal representing images captured by the camera to the controller 800 via a connecting channel 804. The controller is configured to estimate a distance between the user's eyes. An output from the controller 800 provides an adjustment signal to an image generator 806 which is used to adjust a relative position of the video images on the left and right video display elements as illustrated and explained above with reference to FIGS. 7a and 7b.

As explained above, as an alternative a position of the video display elements 150*l*, 150*r* may be adjusted to compensate for the interoccular distance Di using an image position adjuster 810 which receives a signal from a control line 812 from the controller 800 representing an adjustment to be made.

According to the present technique when the user fits the HMD to the user's head, a process is performed by the controller 800 to estimate the interoccular distance. The user fits the HMD to the user's head by picking-up the HMD and disposing the HMD on the user's head which will be referred to in the following explanation as a motion period. The process of estimating the interoccular distance generates an estimate of the interoccular distance Di the motion signal during the motion period.

Figures 9A, 9B, 9C:
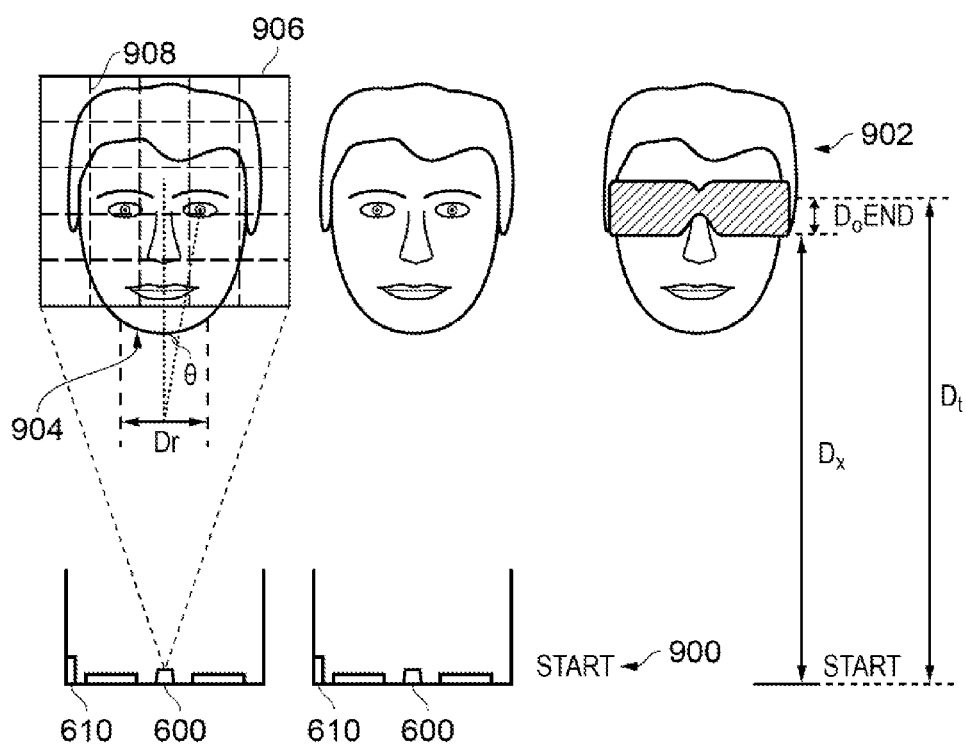
FIGS. 9a to 9c are schematic representations illustrating a process in which a user mounts the HMD from a start position onto the user's face in an end position.

As shown in FIGS. 9*a*, 9*b* and 9*c* from a start position 900 the HMD is moved to an end position 902 in which it is disposed on the user's head a known fixed offset distance Do away from the user's eyes, where the offset distance may be dependent on a structure of the HMD. As shown in FIG. 9*a* in the start position 900, the camera 600 captures an image of the users face 904. Using known techniques for detecting a face and detecting eyes and/or eye tracking and knowledge of the cameras field of view, a relative separation of the user's eyes Dr in terms of pixels and thus an angle between the user's eyes θ is determined by the controller from an image of the user 906 captured by the camera 600. In some instances the start position may be defined or triggered by the controller when the user's eyes are first reliably recorded at a sufficient pixel scale in the image captured by the camera, rather than at the beginning of the movement to fit the HMD to the user's head. This approach may ensure that a reliable image is captured at the start position and but that images are obtained at regular intervals when the HMD is being fitted until an image where the eyes are reliably recorded is captured.

In some examples the camera 600 may capture an infra-red illumination which may also include an image projected onto the user's face from a structured light solution such as range finding, dots or a grid 908. Accordingly using the image 906 of the user's face captured by the camera 600 a relative separation Dr of the user's eyes from the image 906 and thus an angle between the user's eyes θ is determined.

There then follows a part of the process by which the controller determines a distance Dx from the start position 900 to the end position 902 by processing samples of the motion signal captured during the motion period. From the start position 900 the motion detector 610 detects a motion of the HMD with respect to time for the motion period. That is samples of the motion signal generated by the motion detector 610 is captured by the controller 800 from the start position 900 to the end position 902 which defines the motion period. In one example the motion detector 610 is an accelerometer which detects an acceleration of the HMD.

Figure 10A:
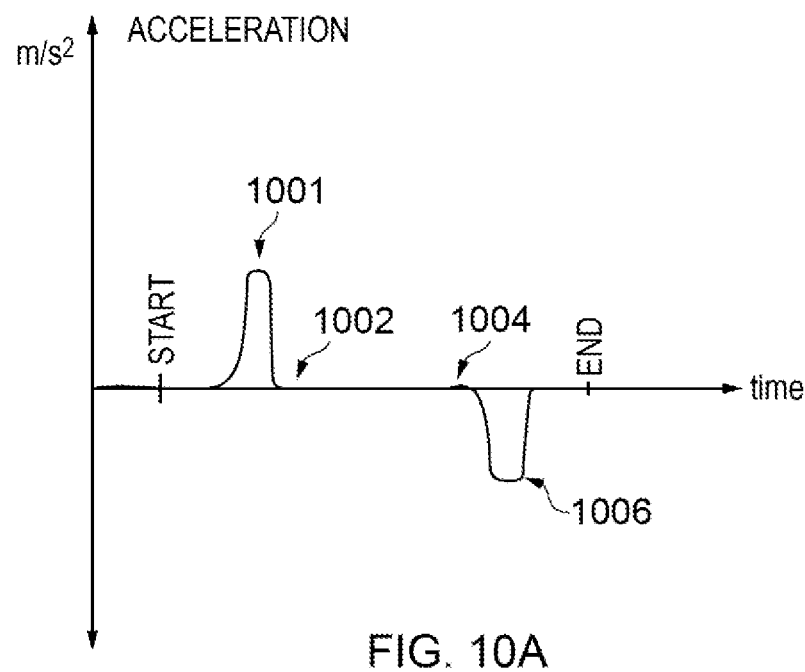
FIG. 10a is a graphical representation of a plot of acceleration with respect to time during a motion period.
Figure 10B:
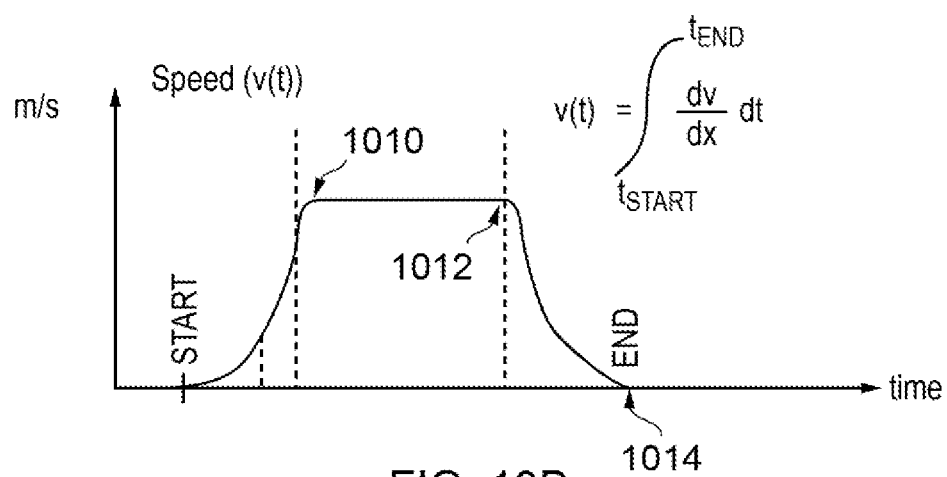
FIG. 10b is a graphical representation of velocity or speed of the HMD with respect to time during a motion period.
Figure 10C:
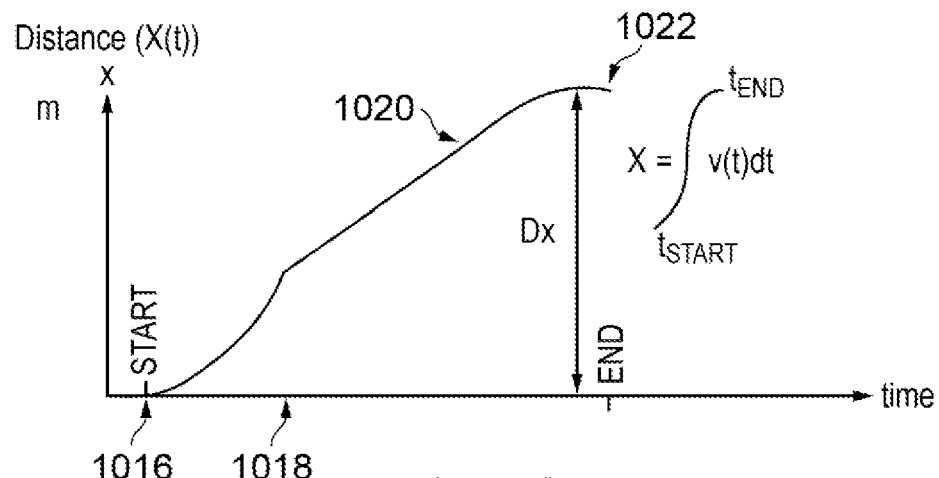
FIG. 10c is a representation of a plot of distance with respect to time for the motion period.

The process of estimating a distance Dx from the start position 900 to the end position 902 is illustrated in FIGS. 10*a*, 10*b* and 10*c*. In FIG. 10*a* a plot of acceleration with respect to time from the start position 900 to the end position 902 which is in the motion period is provided as a graphical representation of a possible plot of acceleration with respected to time for the motion period. As shown in FIG. 10*a* as the user picks up the HMD the motion detector 610 detects a positive acceleration which produces a positive peak 1001 and then falls to zero 1002 as the HMD is moved with a substantially constant speed. Therefore during a middle section which 1002, 1004 corresponds to a process in which the HMD is moving towards the users face, there is zero acceleration. As the user mounts the HMD on the user's face then the HMD slows and accordingly a negative acceleration, that is a deceleration is detected in the motion signal which is illustrated by a negative peak 1006. Although in FIGS. 10*a*, 10*b* and 10*c* the HMD is stationary at the start position, it is also possible that, if the start position is defined as the point where a first reliable image of the eyes is captured by the camera, the HMD may not be stationary at the start position. For instance this may occur when the HMD is being picked-up off a floor and the camera is only able to capture a reliable image of the eyes after an initial period of movement by the HMD.

According to the present technique the controller 800 performs an integration of the motion signal generated by the motion detector 610 to produce samples of speed with respect to time during the motion period. An example illustration of a plot of speed with respect to time for the motion period produced by integrating the motion signal is shown in FIG. 10*b*. As shown in FIG. 10*b* and in correspondence with the acceleration detected in FIG. 10*a* from the start position 900 the movement of the HMD accelerates to a constant speed during a middle portion of the movement 1010, 1012 in which the speed is constant. After the constant speed as the user puts the HMD on the user's face then the HMD experiences deceleration until the end position 1014. Thus by integrating the motion signal the plot of speed with respect to time during the motion period can be generated. As previously mentioned, in some circumstances the HMD may not be stationary at the start position and therefore when the HMD comes to the end position the plot of speed with respect to time may show a negative speed instead of zero. However, the negative speed will correspond to the speed of the HMD at the start position and can therefore be used to compensate for the initial speed of the HMD by shifting the speed plot such that the speed at the end position is zero.

The controller 800 then performs a further integration of the samples of speed with respect to time during the motion period to produce samples of distant with respect to time. An example representation of a plot of distance with respect to time during the motion period is shown in FIG. 10*c*. As shown in FIG. 10*c*, as a result of the integration during the motion period that is from the start time to the end time a plot is produced of distance with respect to time. In correspondence with the other examples, the HMD experiences an initial acceleration during a first part of the process of fitting the HMD 1016, 1018 followed by a constant change in distance with respect to time 1020 at which point deceleration is experienced before the HMD is disposed on the user's face 1022. Thus, by integrating the acceleration signal, generated by the motion signal twice a plot of distance with respect to time is determined. Accordingly, the distance Dx between the start position at which point the image of the user's eyes was captured by the camera 600 until the end position 902 in which it is disposed on the users face as shown in FIG. 9*c* can be determined. The distance between the start point and the user's eyes Dt can then be calculated by summing Dx and Do.

Figure 11:
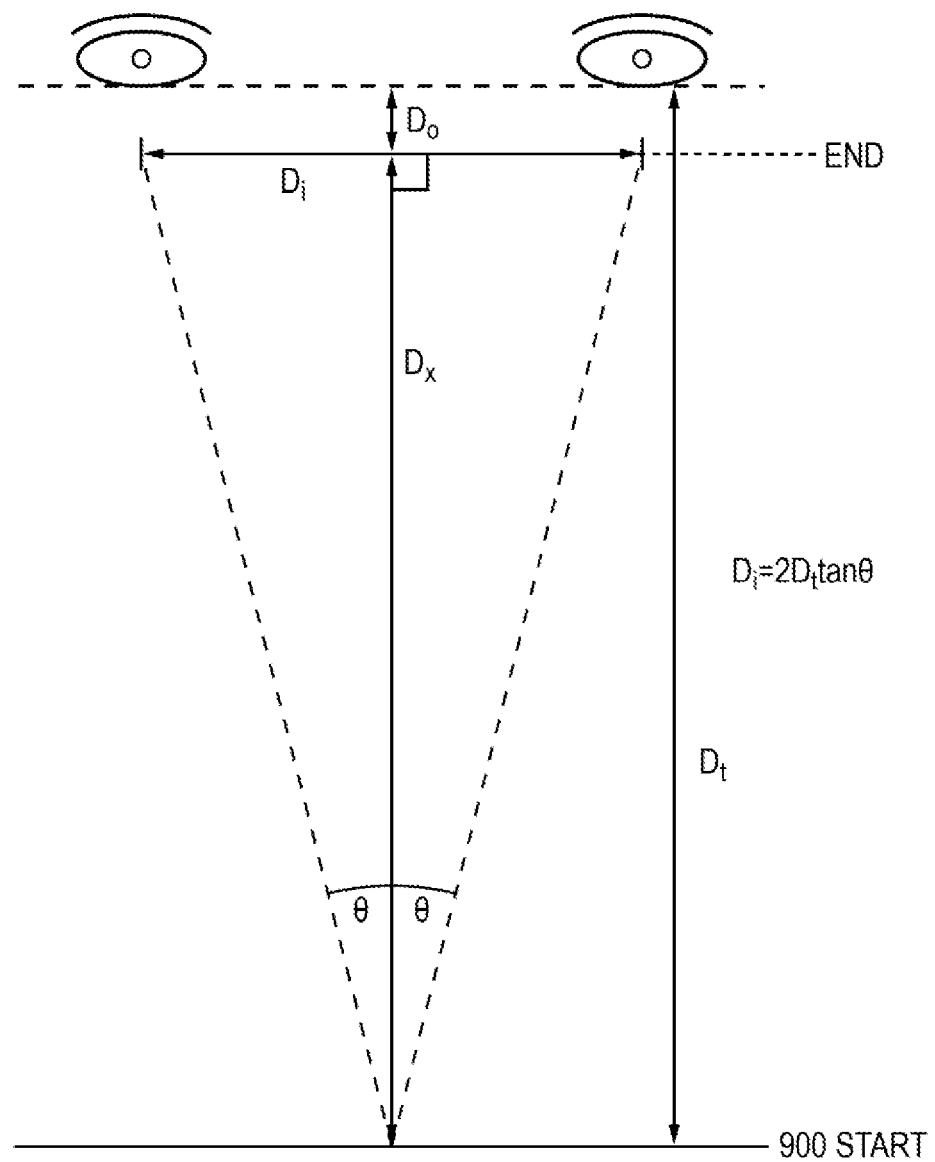
FIG. 11 is a schematic diagram illustrating geometrical relationships.

Finally the interoccular distance Di can be determined from the angle between the user's eyes captured by the camera 600 at the start position θ by combining the estimated distance Dt from the start position 900 to the user's eyes with the angle θ. For example, as shown in FIG. 11, the distance from the start position to the user's eyes Dt can be combined with the estimated angle between the user's eyes θ obtained from the relative separation of the user's eyes Dr in the image captured by the camera at the start position. Using conventional trigonometry the interoccular distance, Di may then be calculated as according to Di=2Dt tan θ. Using the angle θ and knowing the estimated distance Dt, a relative increase in the separation from the distance Dr, can be determined.

As will be appreciated there are numerous alternative processes to estimate the distances Dx and Dt and therefore the interoccular distance Di. In some embodiments the distance Dt may be estimated using a range finder such as a structured light solution or a sonar device which is deposed on the HMD and directed towards the user's face when the HMD is being fitted to the user's head. Examples of a structured light solution may include an infrared range finding camera such as a Sony Z-cam. Alternatively, a structured light solution may include two light beam sources which are separated horizontally on a same plane and angled inwards towards each other. In this configuration the beams of light will be incident on a same area of a surface, i.e. a portion of the head, and fully overlap when the surface is a predetermined distance from the light sources, the predetermined distance being dependent on the inward angles of the light beams and the horizontal separation of their sources. Consequently, when the beams are detected as fully overlapping in a captured image the distance of the HMD from the user's head will be known.

In other embodiments a pair of images captured by stereoscopic cameras deposed on the HMD may be used to calculate a distance from the HMD to the user's eyes. In this embodiment the disparity between a feature that is present in both images can be used along with the camera parameters to derive the distance Dt. In such an embodiment only a start position is required because the distance can be directly calculated from the single pair of stereoscopic images.

In further embodiments, the relative scale of the eyes from images captured at the start and end positions and the known distance Do can be used to derive Di. At the start position a measurement in terms of pixels is taken of the interoccular distance and the outer iris diameter, a repeat measurement of the out iris diameter is also taken at the end position. The interoccular distance in terms of pixels at the start position can then be scaled based on a change in measurements of the outer iris diameter between the start and end positions. This allows the interoccular distance Di in terms of pixels at the end position to be obtained. The end position interoccular pixel distance can then be converted to millimeters or other units by using the known distance from the camera on the HMD to the eyes Do at the end position and the camera's field of view. This is done by equating a pixel to an angle in the end position image and using the distance Do and standard trigonometry to equate the angle to a horizontal distance.

As will be appreciated from the above explanation, embodiments of the present invention can provide an automatic detection of the interoccular distance when the user fits the HMD on the user's head.

Furthermore by repeating the estimate on one or more other occasions a refined estimate of the user's interoccular distance can be generated by combining a plurality of estimates of the interoccular distance with previous estimates. It may also be beneficial to repeat the capturing of an image of the eyes so as to define multiple start positions because a refined estimate of the interoccular distance may be obtained. For instance, multiple images could be captured a predetermined time apart and the interoccular distance estimate based on each image combined and or averaged in order to reduce the effects of noise and others factor which may degrade an estimate, thus obtaining a refined estimate. In other examples the interoccular distance is generated each time the HMD is fitted by the user on the user's head, in a situation in which a different user fits the HMD. Alternatively a reset switch could be used to reset the interoccular distance estimate for a new user to generate a new interoccular distance.

Figure 12:
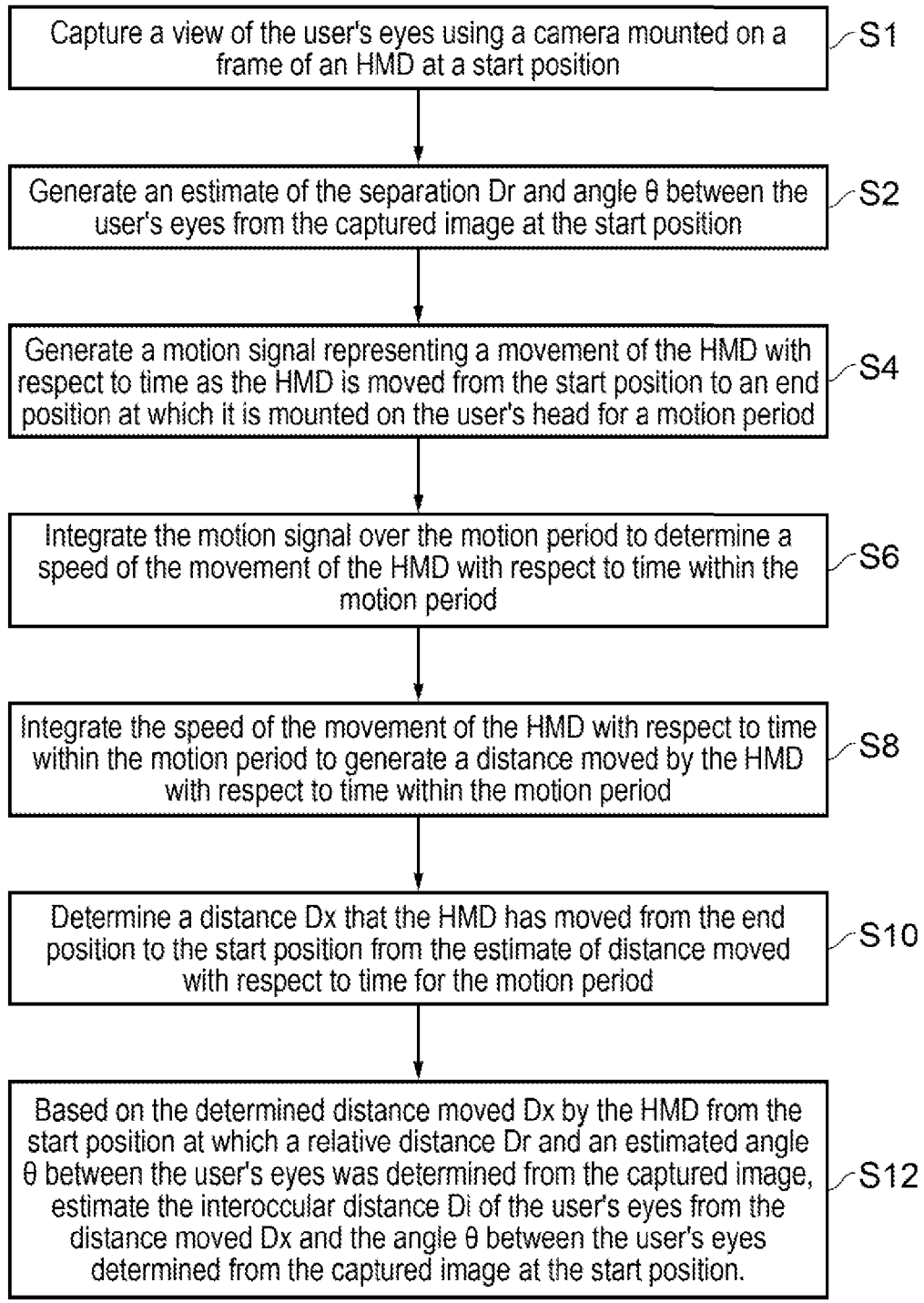
FIG. 12 is a flow diagram representing a process of calculating an estimate of a distance between a user's eyes in accordance with the present technique.

A method of determining the interoccular distance according to one embodiment is summarised as follows with reference to the flow diagram shown in FIG. 12:

S1: A view of the user's eyes is captured using a camera mounted on a frame of an HMD at a start position;

S2: An estimate of the separation Dr and angle between the user's eyes θ is generated from the captured image at the start position;

S4: A motion signal is generated representing a movement of the HMD with respect to time as the HMD is moved from the start position to an end position at which it is mounted on the user's head for a motion period.

S6: The motion signal is integrated over the motion period to determine a speed of the movement of the HMD with respect to time within the motion period;

S8: The speed of the movement of the HMD is integrated with respect to time within the motion period to generate a distance moved by the HMD with respect to time within the motion period;

S10: A distance Dx that the HMD has moved from the end position to the start position is determined from the estimate of distance moved with respect to time for the motion period;

S12: Based on the determined distance Dx moved by the HMD from the start position at which a relative distance Dr and an estimated angle θ between the user's eyes was determined from the captured image, the interoccular distance Di of the user's eyes is estimated from the distance moved Dx and the angle between the user's eyes θ determined from the captured image at the start position.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the invention.

Numerous modifications and variations of the present disclosure are possible in light of the above teachings. It is therefore to be understood that within the scope of the appended claims, the invention may be practised otherwise than as specifically described herein.

The invention claimed is:
1. A head-mountable display comprising:
a frame which is configured to be mounted on a user's head,
a camera mounted on the frame for capturing a view of the user's eyes,
a motion detector for detecting motion of the head mountable display and for generating a motion signal representing a movement of the head mountable display with respect to time, and
a controller configured to estimate a relative distance between the user's eyes with respect to the frame by capturing a relative separation of the user's eyes from an image of the user's eyes captured by the camera at a start position, to process a motion period of the motion signal corresponding to a process in which the user moves the head mountable display from the start position to dispose the head mountable display on the user's head at an end position, and to estimate the relative distance between the user's eyes with respect to the frame by determining a distance from the start position of the head mountable display at which the image of the user's eyes was captured to the end position in which the head mountable display is disposed on the user's head in combination with the relative separation of the user's eyes in the image of the user's eyes captured by the camera at the start position.

2. A head mountable display as claimed in claim 1, wherein the processing the motion period of the motion signal includes integrating the motion signal over the motion period.

3. A head mountable display as claimed in claim 2, wherein the integrating the motion signal over the motion period includes:
- determining a speed of the movement of the head mountable display with respect to time within the motion period,
- integrating the speed of the movement of the head mountable display with respect to time within the motion period to generate a distance moved by the head mountable display with respect to time within the motion period,
- from the end position of the motion period, determining a distance that the head mountable display has moved from the end position to the start position, and
- based on the determined distance moved by the head mountable display from the start position at which a relative distance between the user's eyes can be determined, estimating the separation of the user's eyes from the distance moved by the head mountable display from the start position to the end position.

4. A head mountable display as claimed in claim 1, wherein the frame defines a first eye display position and a second eye display position, and the head mountable display includes
- a first display element mounted with respect to the first eye display position for displaying a first video image from a video source to the user's first eye,
- a second display element mounted with respect to the second eye display position for displaying a second video image from the video source to the user's second eye, and
- consequent upon the estimated distance between the user's eyes, the controller is configured to adjust a relative position of the first and second video images with respect to the user's eyes.

5. A head mountable display as claimed in claim 4, wherein the controller is configured to adjust the position of the first and second video images on the first and second eye display elements in response to the estimated distance between the user's eyes.

6. A head mountable display as claimed in claim 4, wherein the controller is configured to adjust a position of the first and second display elements with respect to the first and second eye display positions in response to the estimated distance between the user's eyes.

7. A head mountable display as claimed in claim 1, in which the controller is configured to re-estimate the relative distance between the user's eyes from a subsequent motion period and to combine the re-estimated distances between the user's eyes with previous estimates to produce a refined estimate of the distance between the user's eyes.

8. A head mountable display as claimed in claim 1, in which the motion detector comprises an accelerometer.

9. A method of operating a head-mountable display comprising:
- capturing a view of the user's eyes using a camera mounted on a frame which is configured to be mounted on a user's head,
- detecting motion of the head mountable display,
- generating a motion signal representing a movement of the head mountable display with respect to time,
- capturing a relative separation of the user's eyes from an image of the user's eyes captured by the camera at a start position,
- processing a motion period of the motion signal corresponding to a process in which the user moves the head mountable display from the start position to dispose the head mountable display on the user's head at an end position, and
- estimating the relative distance between the user's eyes with respect to the frame by determining a distance from the start position of the head mountable display at which the image of the user's eyes was captured to the end position in which the head mountable display is disposed on the user's head in combination with the relative separation of the user's eyes in the image of the user's eyes captured by the camera at the start position.

10. A method as claimed in claim 9, wherein the processing the motion period of the motion signal includes integrating the motion signal over the motion period.

11. A method as claimed in claim 10, wherein the integrating the motion signal over the motion period includes:
- determining a speed of the movement of the head mountable display with respect to time within the motion period,
- integrating the speed of the movement of the head mountable display with respect to time within the motion period to generate a distance moved by the head mountable display with respect to time within the motion period,
- from the end position of the motion period, determining a distance that the head mountable display has moved from the end position to the start position, and
- based on the determined distance moved by the head mountable display from the start position at which a relative distance between the user's eyes can be determined, estimating the separation of the user's eyes from the distance moved by the head mountable display from the start position to the end position.

12. A method as claimed in claim 9, wherein the frame defines a first eye display position and a second eye display position, and the head mountable display includes a first display element mounted with respect to the first eye display position for displaying a first video image from a video source to the user's first eye, a second display element mounted with respect to the second eye display position for displaying a second video image from the video source to the user's second eye, and the method comprises
- consequent upon the estimated distance between the user's eyes, adjusting a relative position of the first and second video images with respect to the user's eyes.

13. A method as claimed in claim 12, wherein the adjusting a relative position of the first and second video images with respect to the user's eyes, comprises adjusting the position of the first and second video images on the first and second eye display elements in response to the estimated distance between the user's eyes.

14. A method as claimed in claim 12, wherein adjusting a relative position of the first and second video images with respect to the user's eyes comprises adjusting a position of the first and second display elements with respect to the first and second eye display positions in response to the estimated distance between the user's eyes.

15. A method as claimed in claim 9, comprising re-estimating the relative distance between the user's eyes from a subsequent motion period and to combine the re-estimated distances between the user's eyes with previous estimates to produce a refined estimate of the distance between the user's eyes.

16. A non-transitory machine-readable storage medium storing computer software thereon for carrying out a method according to claim 9.

\* \* \* \* \*